United States Patent
Rakshit et al.

(10) Patent No.: US 11,351,719 B2
(45) Date of Patent: Jun. 7, 2022

(54) ADDITIVE MANUFACTURING OF WIREFRAME OBJECTS

(71) Applicant: International Business Machines Corporation, Armonk, NY (US)

(72) Inventors: Sarbajit K. Rakshit, Kolkata (IN); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 16/670,045

(22) Filed: Oct. 31, 2019

(65) Prior Publication Data
US 2021/0129421 A1 May 6, 2021

(51) Int. Cl.
| | |
|---|---|
| *B29C 64/209* | (2017.01) |
| *B29C 64/118* | (2017.01) |
| *B29C 64/295* | (2017.01) |
| *B29C 64/245* | (2017.01) |
| *B29C 64/241* | (2017.01) |
| *B29C 64/393* | (2017.01) |
| *B29C 64/232* | (2017.01) |

(Continued)

(52) U.S. Cl.
CPC .......... *B29C 64/118* (2017.08); *B29C 64/209* (2017.08); *B29C 64/232* (2017.08); *B29C 64/236* (2017.08); *B29C 64/241* (2017.08); *B29C 64/245* (2017.08); *B29C 64/295* (2017.08); *B29C 64/30* (2017.08); *B29C 64/321* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC .............................. B29C 64/118; B29C 64/209
See application file for complete search history.

(56) References Cited

U.S. PATENT DOCUMENTS

| | | |
|---|---|---|
| 2019/0084224 A1 | 3/2019 | Guimbretiere et al. |
| 2019/0105833 A1 | 4/2019 | Cambron et al. |

FOREIGN PATENT DOCUMENTS

| | | |
|---|---|---|
| CN | 107914395 A | 4/2018 |
| CN | 108189397 A | 6/2018 |

OTHER PUBLICATIONS

Liszewski, A., "3D Printing Just Wireframe Models Can Vastly Speed Up Prototyping", Sep. 19, 2014, 4 pages <https://gizmodo.com/3d-printing-just-wireframe-models-can-vastly-speed-up-p-1636794112>.

(Continued)

*Primary Examiner* — Atul P. Khare
(74) *Attorney, Agent, or Firm* — Stosch Sabo

(57) ABSTRACT

Described are techniques for additive manufacturing including a method comprising generating printing parameters for fabricating a wireframe component using additive manufacturing, where the printing parameters include a print head path of travel and a print head speed of travel for a respective portion of the wireframe component. The method further comprises fabricating the wireframe component using a three-dimensional printer by applying, using at least one inductor, a magnetic field to an oscillating printer head, where the magnetic field is configured to influence a first direction of travel and a first speed of travel of the oscillating printer head during fabrication of the respective portion of the wireframe component, and applying a movement to a moveable platform, where the movement includes a second direction of travel and a second speed of travel during fabrication of the respective portion of the wireframe component.

17 Claims, 5 Drawing Sheets

(51) Int. Cl.
*B29C 64/236* (2017.01)
*B29C 64/321* (2017.01)
*B29C 64/30* (2017.01)
*B33Y 50/02* (2015.01)
*B33Y 10/00* (2015.01)
*B33Y 30/00* (2015.01)
*B33Y 40/00* (2020.01)

(56) References Cited

OTHER PUBLICATIONS

Markhacks, "Amazing Magnetic Pendulum", Published on Jun. 12, 2019, 2 pages <https://www.youtube.com/watch?v=Yy7en8hBiwE>.

Wikipedia, "Force between magnets", From Wikipedia, the free encyclopedia, last edited on Mar. 31, 2019, 10 pages, <https://en.wikipedia.org/wiki/Force_between_magnets>.

Huber et al., "3D print of polymer bonded rare-earth magnets, and 3D magnetic field scanning with an end-user 3D printer", Appl. Phys. Lett. 109, Published Online: Oct. 17, 2016, 19 pages <https://aip.scitation.org/doi/full/10.1063/1.4964856>.

Williams, A., "3D Printing Permanent Magnets", Hackaday, Nov. 12, 2016, 13 pages <https://hackaday.com/2016/11/12/3d-printing-permanent-magnets/>.

Unknown, "3-D-printed magnets: How can you produce a magnet with exactly the right magnetic field?", Vienna University of Technology, Oct. 25, 2016, 5 pages https://www.sciencedaily.com/releases/2016/10/161025115757.htm.

ADDITIVE MANUFACTURING OF WIREFRAME OBJECTS

BACKGROUND

The present disclosure relates to additive manufacturing, and, more specifically, to additive manufacturing of wireframe objects.

Additive manufacturing includes manufacturing techniques such as three-dimensional (3D) printing. In 3D printing, material is deposited layer-by-layer to create a component. 3D printing can be useful in applications such as prototype manufacturing and custom manufacturing of any number of parts. Further, 3D printing can be useful in applications requiring unique, delicate, complex, and/or interior geometries that are more efficient to manufacture using 3D printing than other manufacturing techniques.

SUMMARY

Aspects of the present disclosure are directed toward a method comprising generating printing parameters for fabricating a wireframe component using additive manufacturing, where the printing parameters include a print head path of travel and a print head speed of travel for a respective portion of the wireframe component. The method further comprises fabricating the wireframe component using a three-dimensional printer by applying, using at least one inductor, a magnetic field to an oscillating printer head, where the magnetic field is configured to influence a first direction of travel and a first speed of travel of the oscillating printer head during fabrication of the respective portion of the wireframe component and by applying a movement to a moveable platform, where the movement includes a second direction of travel and a second speed of travel during fabrication of the respective portion of the wireframe component. The first direction of travel together with the second direction of travel can equal the print head path of travel for the respective portion of the wireframe component. Further, the first speed of travel together with the second speed of travel can equal the print head speed of travel for the respective portion of the wireframe component.

Additional aspects of the present disclosure are directed to systems and computer program products configured to perform the method described above.

Further aspects of the present disclosure are directed toward a three-dimensional printer comprising a moveable platform configured to support a wireframe component during fabrication, where the moveable platform is configured to translate and rotate during fabrication of the wireframe component. The three-dimensional printer further comprises an oscillating printer head configured to deposit a material onto the moveable platform to fabricate the wireframe component. The three-dimensional printer further comprises an inductor configured to apply a magnetic field to cause movement in the oscillating printer head.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1B:
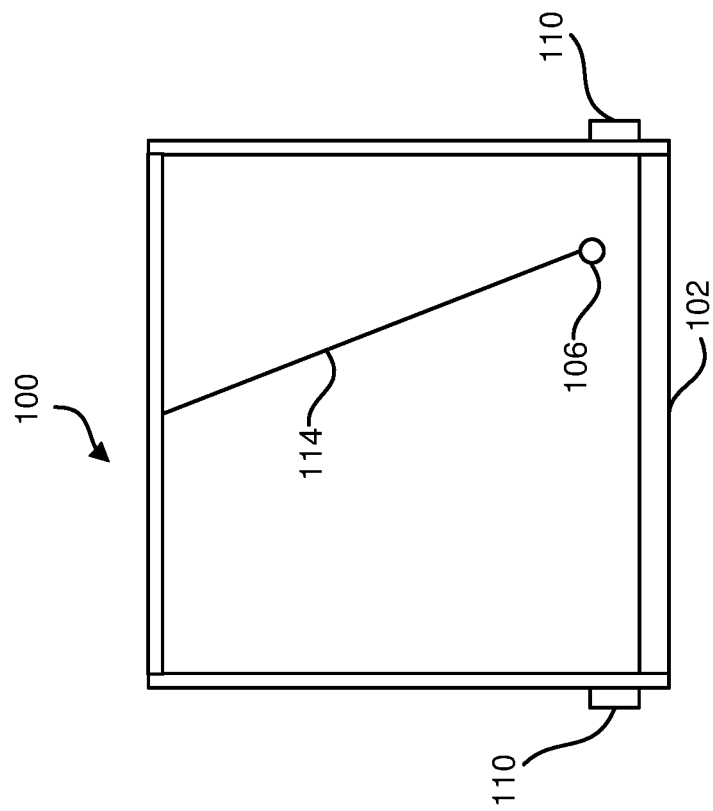
FIG. 1B illustrates a block diagram of a side view of an example 3D printer, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward additive manufacturing, and, more specifically, to additive manufacturing with magnetic manipulation. While not limited to such applications, embodiments of the present disclosure may be better understood in light of the aforementioned context.

Additive manufacturing (also referred to as three-dimensional (3D) printing) involves receiving a computer-aided design (CAD) model, parsing the CAD model into numerous layers, and then printing each layer sequentially to physically manufacture a component based on the CAD model. The printing can function by any number of techniques and processes that are configured to fuse, join, or otherwise combine material. For example, 3D printing can be performed by vat photopolymerization, material jetting, binder jetting, powder bed fusion, material extrusion, directed energy deposition, sheet lamination, fused filament deposition (FFD), stereolithography (SLA), and/or other 3D printing techniques.

A variety of materials can be used in manufacturing. These materials can include thermoplastics that are heated to a flowing point, deposited according to the layer-by-layer deposition protocol, and allowed to cool to solidify and bind with any adjacent material. In some situations, multiple materials are used. Regardless of the number of materials used, each material can be compounded with different modifiers for color, strength, magnetism, and/or other customized aesthetic or structural properties.

Aspects of the present disclosure are directed to (1) a 3D printer having a moveable printing platform, (2) a 3D printer having an oscillating printer head, and/or (3) a 3D printer having both a moveable printing platform and an oscillating printer head. Each of these embodiments can be useful for improved printing of objects such as wireframe objects. For example, the improved printing of objects can relate to improved functionality (e.g., capability to print complex geometries that are otherwise difficult or impossible to print) and/or efficiency (e.g., reduced printing time for a given object relative to other additive manufacturing techniques).

As discussed herein, wireframe objects can refer to 3D objects that are simplified representations of solid structures. Wireframe objects can include one or several curvilinear lines that may be as thin as a thermoplastic filament (e.g., less than 4.00 millimeters (mm) (0.157 inches) in diameter) and which together form an object having a functional and/or aesthetic purpose.

Aspects of the present disclosure are directed to a 3D printer that is useful for printing wireframe objects. The 3D printer can include a moveable platform and/or an oscillating printer head. The 3D printer can include inductors surrounding all or part of the moveable platform. The inductors can function as magnets when supplied with electricity and the magnetic field generated by the inductors can influence a direction of travel and a speed of travel of the oscillating printer head. Advantageously, an oscillating printer head with a moveable platform can together realize a relative speed and a relative direction useful for facilitating fabrication of complex geometries and/or improving fabrication speed.

Figure 1A:
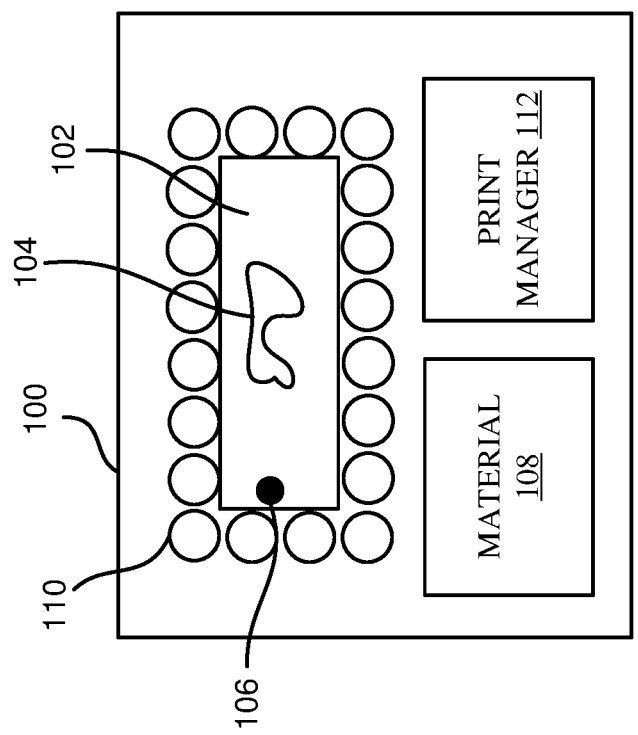
FIG. 1A illustrates a block diagram of a top view of an example three-dimensional (3D) printer, in accordance with some embodiments of the present disclosure.

Referring now to the figures, FIG. 1A illustrates a block diagram of a top view of an example 3D printer 100, in accordance with some embodiments of the present disclosure. 3D printer 100 includes a moveable platform 102 for supporting a wireframe component 104 during fabrication by layer-by-layer deposition of a material 108 from an oscillating printer head 106. The oscillating printer head 106 can be configured to deposit material 108 at a predetermined feed rate using an orifice of predetermined size with a predetermined backpressure and at a predetermined temperature. The oscillating printer head 106 can be attached by a connector 114 (shown in FIG. 1B but not visible in FIG. 1A) of variable length to a top portion of the 3D printer 100. The oscillating printer head 106 can be configured to traverse around the moveable platform 102 while printing the wireframe component 104.

The oscillating printer head 106 can include a ferromagnetic material (e.g., iron, nickel, cobalt, awaruite, wairauite, or another material with ferromagnetic properties) that is responsive to a magnetic field generated by one or more inductors 110 that are adjacent to the moveable platform 102. The oscillating printer head 106 can be fabricated from a ferromagnetic material, or the oscillating printer head 106 can be a composite including a matrix phase and a ferromagnetic additive phase, where the ferromagnetic additive can be in particle, platelet, rod, short-fiber, long-fiber, and/or continuous-fiber form. Such a ferromagnetic additive can be incorporated into a composite at a predetermined loading percentage by weight. For example, the ferromagnetic additive can be loaded into the composite at a weight percent of between and including 0.5% to 5.0% and/or between 5.0% and 30.0%. In other embodiments, other amounts of loading, such as less than 0.5% or more than 30.0% are possible. The matrix phase can be a plastic (e.g., a thermoplastic, a thermoset, an elastomer, or a combination of the aforementioned), a metal, or a ceramic.

Material 108 can include any type of material suitable for additive manufacturing. Some non-limiting examples of material 108 can include acrylonitrile butadiene styrene (ABS), thermoplastic elastomers (TPEs), thermoplastic urethanes (TPUs), poly-lactic acid (PLA), polystyrene (PS), high-impact polystyrene (HIPS), polyethylene (PE), polyethylene terephthalate (PET), polyethylene terephthalate glycol-modified (PETG), polypropylene (PP), nylon, acrylonitrile styrene acrylate (ASA), polycarbonate (PC), polyvinyl alcohol (PVA), and others. In some embodiments, material 108 can include a combination of two or more materials (e.g., a composite, a polymer blend, etc.). Although not explicitly shown, the material 108 can include any number of additives useful for improving processability, improving longevity, or improving mechanical, electrical, or temperature properties. For example, the material 108 can include plasticizers, nucleating agents, desiccants, impact modifiers, chain extenders, stabilizers, carboxyl scavengers, fillers (e.g., mineral, wood, metal, aramid, carbon, graphite, etc.), and the like. Material 108 can be stored in a spooled filament, where the filament can have a diameter of approximately 3.00 mm (0.118 inches), approximately 1.75 mm (0.069 inches), or a different diameter. In some embodiments, the material 108 is in filament form and has a diameter of less than or equal to 4.00 mm (0.157 inches).

3D printer 100 further includes a plurality of inductors 110 surrounding the platform 102. Inductors 110 can refer to coils, chokes, or reactors that function as passive two-terminal electrical components that store energy in the form of a magnetic field when supplied with an electrical current. In some embodiments, each of the inductors 110 includes an insulated wire wound around a core. The inductors 110 shown in FIG. 1A are purely for illustrative purposes and more or fewer inductors 110 are utilized in alternative embodiments. Furthermore, although a single layer of inductors 110 are shown, in some embodiments, inductors 110 are arranged in all three dimensions about moveable platform 102. Inductors 110 can include, but are not limited to, air core inductors, iron core inductors, ferrite core inductors (e.g., soft ferrite or hard ferrite), iron powder inductors, laminated core inductors, bobbin-based inductors, toroidal inductors, multi-layer ceramic inductors, film inductors, variable inductors, coupled inductors, and/or other inductors.

The moveable platform 102 can be configured to move in one or more directions including translational movement (e.g., movement in the x, y, and/or z directions), yaw (e.g., clockwise or counterclockwise rotational movement about a vertical axis of the 3D printer 100), pitch (e.g., clockwise or counterclockwise rotational movement about a lateral axis or transverse axis of the 3D printer 100), roll (e.g., clockwise or counterclockwise rotational movement about a longitudinal axis of the 3D printer 100), and/or a combination of two or more of the aforementioned movements.

3D printer 100 further includes print manager 112. Print manager 112 can be a combination of hardware and software configured to control oscillating printer head 106 for printing wireframe component 104. Print manager 112 can intermittently supply electrical current to inductors 110 to enable, expedite, or otherwise improve manufacturing of the wireframe component 104 by use of magnetic fields that manipulate the path and speed of the oscillating printer head 106. Print manager 112 can likewise control movements in the moveable platform 102 during fabrication of the wireframe component 104. Print manager 112 can be in the form of a computer-readable storage medium storing data files and/or computer program products that are executable by the 3D printer 100.

FIG. 1B illustrates an example side view of the 3D printer 100 in accordance with some embodiments of the present disclosure. FIG. 1B illustrates the moveable platform 102, the oscillating printer head 106, and the inductors 110. FIG. 1B further illustrates the connector 114 affixing the oscillating printer head 106 to an upper portion of the 3D printer 100. The connector 114 can vary in length according to the needs of the wireframe component 104 that is being manufactured. For example, the connector 114 can be dynamically lengthened (e.g., extended or extendable) as the amplitude of the oscillation increases and dynamically shortened (e.g., retracted or retractable) as the amplitude of the oscillation decreases in order to deposit a layer of material 108 that is approximately parallel to the moveable platform 102 when the moveable platform 102 is in a horizontal state. The connector 114 can take many forms including, but not limited to, a solid connector or a hollow connector. When the connector 114 is a solid connector, the solid connector can be fabricated from natural fibers (e.g., jute, cotton, sisal, hemp, etc.), synthetic fibers (e.g., polypropylene, polyester, nylon, polyethylene, etc.), plastics (e.g., thermoplastics, thermosets, elastomers, urethanes, etc.), rubbers (e.g., silicone, neoprene, nitrile, viton, etc.), and/or other materials. When the connector 114 is a hollow connector, the hollow connector can be fabricated from any one or more of the aforementioned materials. Furthermore, when the connector 114 is a hollow connector, the hollow connector can be configured to contain a filament of the material 108. Furthermore, the hollow connector can be configured to maintain a predetermined temperature in order to heat the filament to a desired temperature. In such examples, the hollow connector can receive electricity and the resistance of the hollow connector can be used to generate a predetermined amount of heat. In such embodiments, the hollow connector can further include a thermometer configured to monitor the interior temperature of the hollow connector and adjust the amount of electrical current received at the hollow connector in order to increase or decrease the temperature in the interior of the hollow connector. Managing a temperature of the material 108 in a hollow connector can be beneficial for improving the processability of the material 108.

The inductors 110 can be configured to generate one or more magnetic fields for manipulating a direction and a speed of the oscillating printer head 106. The location of the inductors 110, the strength of the magnetic fields generated by the inductors 110, the weight of the oscillating printer head 106, the amount of ferromagnetic additive in the oscillating printer head 106, and the length of the connector 114 all contribute to the path and speed of the oscillating printer head 106 as it interacts with the magnetic fields generated by the inductors 110.

Furthermore, the moveable platform 102 can translate in any one or more of the three principal axes and/or rotate about any one or more of the three principal axes. Moving the moveable platform 102 can be beneficial for moderating the relative speed between the wireframe component 104 that is being fabricated on the moveable platform 102 and the oscillating printer head 106. As an example, the moveable platform 102 can translate in an opposite direction as the oscillating printer head 106, thereby increasing the relative speed between the moveable platform 102 and the oscillating printer head 106. This may be beneficial for fabricating a long, thin portion of wireframe component 104. However, regardless of the particular geometry, an increased relative speed can reduce manufacturing time. As another example, the moveable platform 102 can translate in a same direction as the oscillating printer head 106, thereby reducing the relative speed between the moveable platform 102 and the oscillating printer head 106. This can be beneficial for creating a thick portion of the wireframe component 104 or for creating a small and complex geometric feature. As yet another example, the moveable platform 102 can move in a combination of translation and rotation relative to the oscillating printer head 106 in order to fabricate an elliptical helix or another complex geometry in the wireframe component 104. These are but a few, non-limiting examples of the various geometries that can be realized by manipulating a relative speed between a moveable platform 102 and an oscillating printer head 106. Many other geometries are possible, including geometries that are not conducive to categorization but which are common in the curvilinear geometries of wireframe components 104.

FIGS. 1A and 1B are non-limiting and are shown purely for illustrative purposes. In some embodiments, more or fewer components than the components shown in FIGS. 1A and 1B are included in the 3D printer 100. Furthermore, the geometries shown in FIGS. 1A and 1B are purely illustrative and are not to be taken in a literal, requisite, or otherwise limiting sense. Likewise, the dimensions, either absolute or relative, as shown in FIGS. 1A and 1B are purely illustrative and are not to be taken in a literal, requisite, or otherwise limiting sense.

Figure 2:
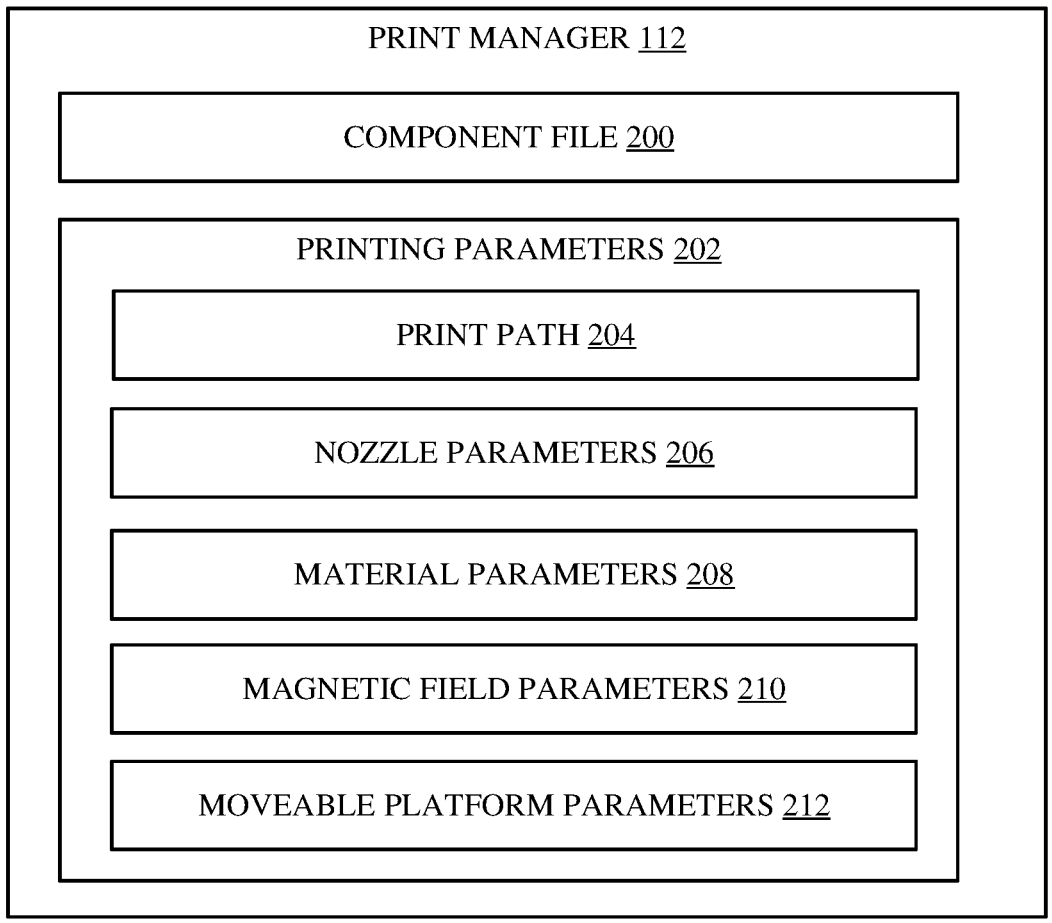
FIG. 2 illustrates an example print manager, in accordance with some embodiments of the present disclosure.

FIG. 2 illustrates a more detailed view of an example print manager 112, in accordance with some embodiments of the present disclosure. Print manager 112 includes, for example, a component file 200 and printing parameters 202. Component file 200 can be, for example, a CAD model of the wireframe component 104 that is stored in, for example, a stereolithography (STL) file format. Component file 200 can include dimensions, tolerances, features, materials, and/or other information associated with wireframe component 104.

Printing parameters 202 can include print path 204, nozzle parameters 206, material parameters 208, magnetic field parameters 210, and/or moveable platform parameters 212. Print path 204 can identify a route for printing the wireframe component 104. The route can include a print head path of travel and a print head speed of travel for respective portions of the wireframe component 104 (as defined in the component file 200). For example, the print head path of travel can be defined by coordinates (e.g., Euclidean coordinates, spherical coordinates, cylindrical coordinates, etc.) for each portion of the wireframe component 104. Likewise, the print head speed of travel can define a speed for depositing the material 108 at respective portions of the wireframe component 104. Aspects of the present disclosure are directed toward simultaneously moving the oscillating printer head 106 (by manipulating magnetic fields using inductors 110) and the moveable platform 102 so that a relative motion and a relative speed between the oscillating printer head 106 and the moveable platform 102 matches the print path 204. In other words, leveraging simultaneous movement of the oscillating printer head 106 and the moveable platform 102 to realize the print path 204 can reduce fabrication time and/or increase fabrication precision.

Nozzle parameters 206 can include, for example, a feed rate of material 108 into the oscillating printer head 106, a backpressure of the material 108 while housed in the oscillating printer head 106, a temperature of the oscillating printer head 106 and/or a temperature of the connector 114, and/or an orifice size and/or an orifice geometry of the oscillating printer head 106.

Material parameters 208 can include, but are not limited to, material properties for one or more materials 108 such as a material type, a material melting point, a material glass transition temperature, a rheological profile of the material (e.g., viscosity, viscosity as a function of shear rate, etc.), a material elasticity profile as a function of temperature, and the like. A material melting point can be useful for determining an appropriate temperature in the oscillating printer head 106 in the nozzle parameters 206. A rheological profile of the material 108 can be useful for defining a feed rate, a backpressure, and/or an orifice size and/or orifice geometry as these factors are all influenced by the rheological characteristics of the material 108.

Magnetic field parameters 210 can include information useful for making a magnetic field capable of directing the oscillating printer head 106 along the print path 204 associated with the wireframe component 104. The magnetic field parameters 210 can be generated based on the properties of the ferromagnetic additive in the oscillating printer head 106, the weight of the oscillating printer head 106, the length of the connector 114, and/or the capabilities and locations of the inductors 110.

Magnetic field parameters 210 can include, but are not limited to, for each inductor 110, an amount of electrical current to provide to the inductor 110 and a time interval during which to provide the electrical current. In embodiments where individual inductors 110 are adjustable to different locations proximate to the moveable platform 102, the magnetic field parameters 210 can further include location information for each inductor 110. In embodiments where the inductors 110 can shape, manipulate, or otherwise direct the magnetic field, the magnetic field parameters 210 can further include directionality information useful for directing the magnetic field.

Moveable platform parameters 212 can include translations and/or rotations to adjust the moveable platform 102 during fabrication of the wireframe component 104. The moveable platform parameters 212 can be configured to realize an appropriate relative speed between the moveable platform 102 and the oscillating printer head 106 during fabrication of the wireframe component 104. In some embodiments, the moveable platform parameters 212 can be configured to generate a small and/or complex geometry while the oscillating printer head 106 remains motionless (e.g., at an amplitude approaching 0°).

FIG. 2 is non-limiting and is shown purely for illustrative purposes. In some embodiments, more or fewer components than the component shown in FIG. 2 are utilized by the print manager 112. Furthermore, in some embodiments, different components can be separated into multiple sub-components or multiple components can be combined into a single component. For example, depending on the design software, slicing software, and/or printer software used, at least print path 204, nozzle parameters 206, and material parameters 208 can be combined into a single data file that is executable by the 3D printer 100.

Figure 3:
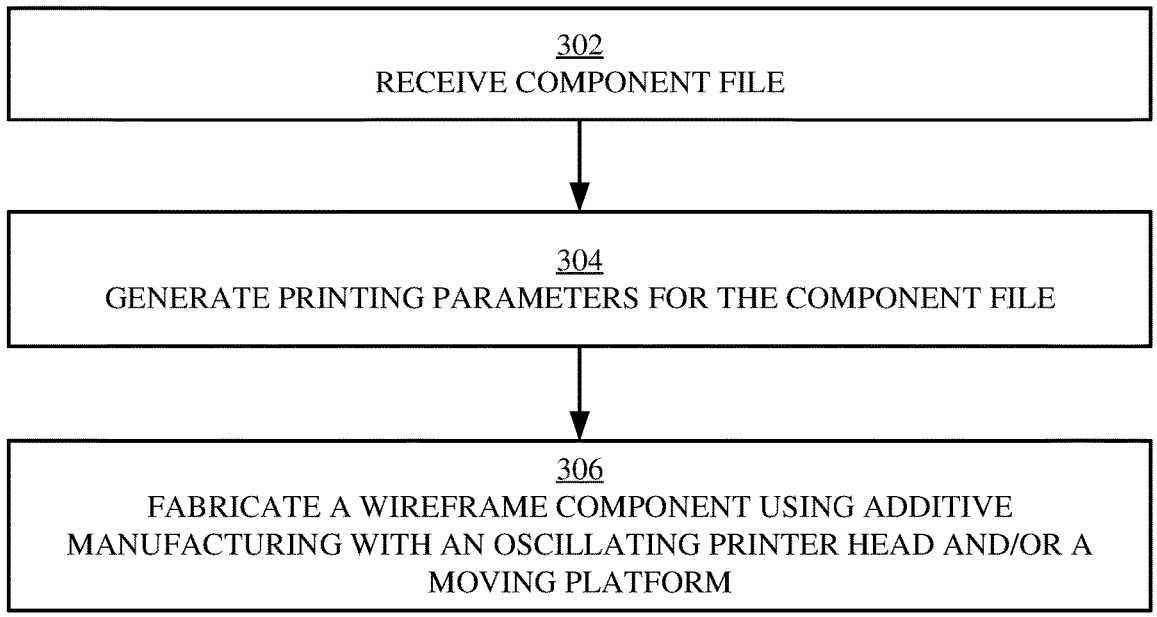
FIG. 3 illustrates a flowchart of an example method for fabricating a wireframe component by additive manufacturing, in accordance with some embodiments of the present disclosure.

FIG. 3 illustrates a flowchart of an example method 300 for performing additive manufacturing of a wireframe component 104, in accordance with some embodiments of the present disclosure. The method 300 can be performed by, for example, a 3D printer 100 or a different configuration of hardware and/or software.

Operation 302 includes receiving a component file 200 of a wireframe component 104 for fabrication by additive manufacturing. Operation 304 includes generating printing parameters 202 based on the component file 200 and the configuration of the 3D printer 100 (e.g., the characteristics of the inductors 110, the length of connector 114, the weight of oscillating printer head 106, the ferromagnetic characteristics of the oscillating printer head 106, etc.). Printing parameters 202 can include one or more of a print path 204, nozzle parameters 206, material parameters 208, magnetic field parameters 210, and/or moveable platform parameters 212.

In some embodiments, generating printing parameters 202 in operation 304 includes utilizing a machine learning model (not shown) to generate the printing parameters 202. For example, operation 304 can further include inputting the component file 200 to the machine learning model and receiving from the machine learning model one or more of print path 204, nozzle parameters 206, material parameters 208, magnetic field parameters 210, and/or moveable platform parameters 212.

Operation 306 includes fabricating the wireframe component 104 using additive manufacturing including an oscillating printer head 106 and/or a moveable platform 102. Operation 306 can thus include rotating and/or translating the moveable platform 102 and/or generating magnetic fields using inductors 110 to direct the oscillating printer head 106. In embodiments including simultaneous movement of the moveable platform 102 and the oscillating printer head 106, the simultaneous movement can equal the print path 204. In other words, in embodiments where the moveable platform 102 moves in a first direction at a first speed and where the oscillating printer head 106 simultaneously moves in a second direction at a second speed, the combination of the first direction and the second direction can equal a print direction defined in the print path 204. Likewise, the combination of the first speed and the second speed can equal a print speed defined in the print path 204. Said another way, a resultant vector from a first vector and a second vector can equal the print path 204, where the first vector defines the speed and direction of the oscillating printer head 106, and where the second vector defines the speed and direction of the moveable platform 102 (or vice versa). In this way, aspects of the present disclosure can leverage relative movement and relative speed between the moveable platform 102 and the oscillating printer head 106 to improve printing efficiency and/or capability of the 3D printer 100.

Figure 4A:
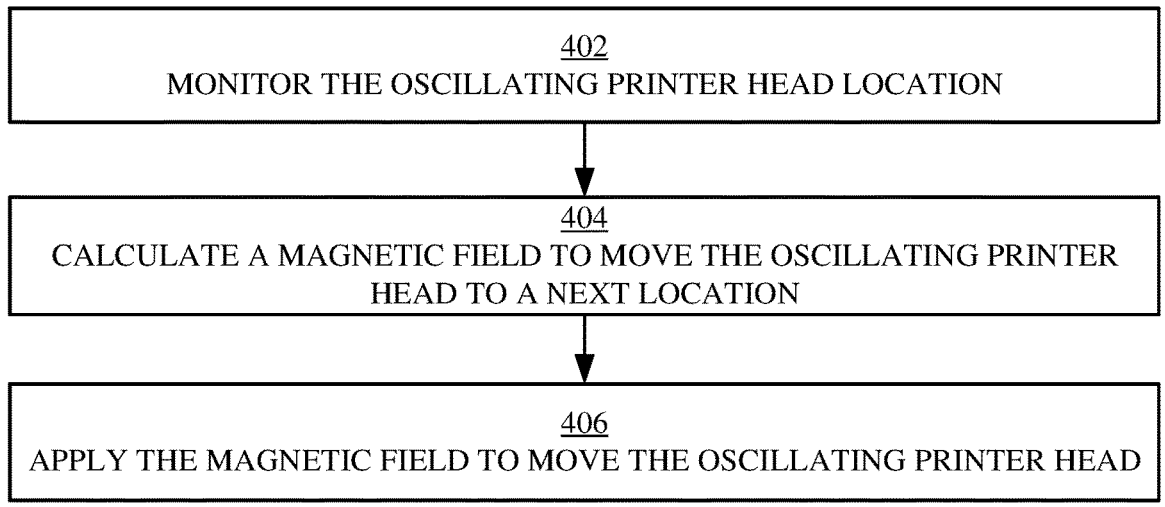
FIG. 4A illustrates a flowchart of an example method for managing movement of an oscillating printer head using one or more magnetic fields, in accordance with some embodiments of the present disclosure.

FIG. 4A illustrates a flowchart of an example method 400 for manipulating the oscillating printer head 106 using a magnetic field generated by one or more inductors 110, in accordance with some embodiments of the present disclosure. In some embodiments, the method 400 is a sub-method of operation 306 of FIG. 3. In some embodiments, the method 400 is implemented by a 3D printer 100 or a different configuration of hardware and/or software.

Operation 402 includes monitoring a location of the oscillating printer head 106. The location of the oscillating printer head 106 can be monitored using one or more sensors such as cameras, lasers, or different sensors. In some embodiments, the location of the oscillating printer head 106 is monitored using a measured angle between the connector 114 and its affixed point in the 3D printer 100, where the angle and the length of the connector 114 can be used to determine the position of the oscillating printer head 106. Likewise, the rate of change in the angle (and the direction of the rate of change of the angle) can be used calculate a speed and a direction of the oscillating printer head 106. These and other methods, techniques, and strategies for monitoring the location and/or speed of the oscillating printer head 106 are within the spirit and scope of the present disclosure.

Operation 404 includes calculating a magnetic field capable of moving the oscillating printer head 106 to a next location of the print path 204 of the wireframe component 104. Calculating the magnetic field can be based on the capabilities of the inductors 110, the locations of the inductors 110, the weight of the oscillating printer head 106, the ferromagnetic properties of the oscillating printer head 106, the location of the oscillating printer head 106, the speed of the oscillating printer head 106, and/or the length of the connector 114. Together, these factors can be used to determine a magnetic field that is within the capabilities of the inductors 110 and that is adequate for manipulating the oscillating printer head 106 to a next position in the print path 204 in light of the other factors affecting motion of the oscillating printer head 106 (e.g., a gravitational force, a momentum of the oscillating printer head 106, etc.).

Although not explicitly shown in FIG. 4A, operation 404 can further include calculating a rate of length change of the connector 114. The rate of length change can be used to dynamically alter the height of the oscillating printer head 106 in the z-dimension (e.g., orthogonal to the moveable platform 102 in a horizontal state).

Operation 406 includes applying the magnetic field in order to cause the oscillating printer head 106 to move to the next position for printing the wireframe component 104. Operation 406 can include supplying a requisite amount of electrical current to one or more inductors 110 for a predetermined time. Furthermore, although not explicitly shown in FIG. 4A, operation 406 can also include dynamically extending or dynamically retracting the connector 114 during the application of the magnetic field in order to influence the height of the oscillating printer head 106 as it proceeds along a next portion of the print path 204.

Figure 4B:
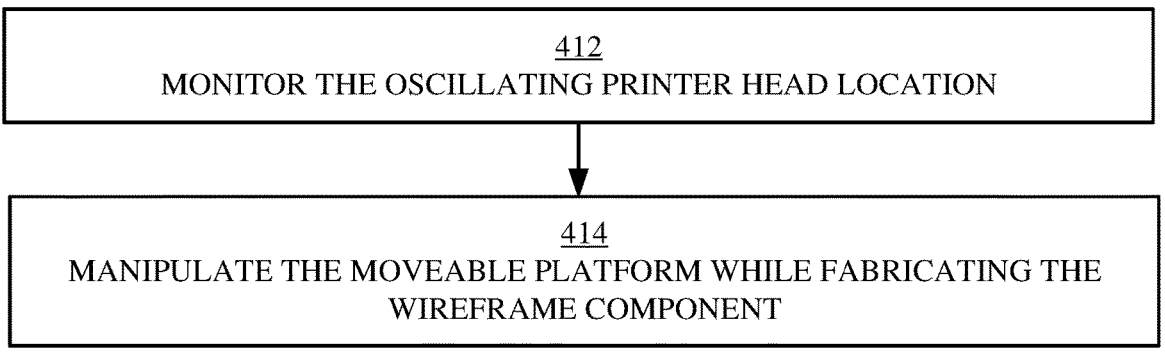
FIG. 4B illustrates a flowchart of an example method for managing movement of a moveable platform of a 3D printer, in accordance with some embodiments of the present disclosure.

FIG. 4B illustrates a flowchart of an example method 410 for manipulating a relative speed between an oscillating printer head 106 and a moveable platform 102, in accordance with embodiments of the present disclosure. In some embodiments, the method 410 is a sub-method of operation 306 of FIG. 3. In some embodiments, the method 410 is implemented by a 3D printer 100 or a different configuration of hardware and/or software.

Operation 412 includes monitoring the location of the oscillating printer head 106. In some embodiments, operation 412 is consistent with operation 402 of FIG. 4A.

Operation 414 includes manipulating the moveable platform 102 while fabricating the wireframe component 104. Manipulating the moveable platform 102 can include translating the moveable platform 102 in any one or more of the principal axes at a predefined speed. Likewise, manipulating the moveable platform 102 can include rotating the moveable platform 102 around any one or more of the principal axes at a predefined angular speed. Moving the moveable platform 102 can be used to fabricate portions of wireframe component 104 in and of itself (e.g., in situations where the oscillating printer head 106 is motionless). Alternatively, moving the moveable platform 102 simultaneously with moving the oscillating printer head 106 can be used to realize a relative motion and a relative speed for improving fabrication of the wireframe component 104.

In some embodiments, the methods 400 and 410 can be combined to realize simultaneous movement of the oscillating printer head 106 (as a result of the magnetic field supplied by the inductors 110 and dynamic changes in the length of the connector 114) with the moveable platform 102 to efficiently fabricate the wireframe component 104. In these embodiments, relative speed and relative motion realized by simultaneous movement of the moveable platform 102 and the oscillating printer head 106 can be used to fabricate certain geometries that are otherwise not readily fabricated using other additive manufacturing techniques. Likewise, relative speed and relative motion realized by simultaneous movement of the moveable platform 102 and the oscillating printer head 106 can be used to fabricate certain geometries at a faster speed than can be realized using other additive manufacturing techniques. Thus, aspects of the present disclosure can realize improved capability for printing wireframe components 104 relative to other additive manufacturing techniques and improved speed of fabricating wireframe components 104 relative to other additive manufacturing techniques.

Figure 5:
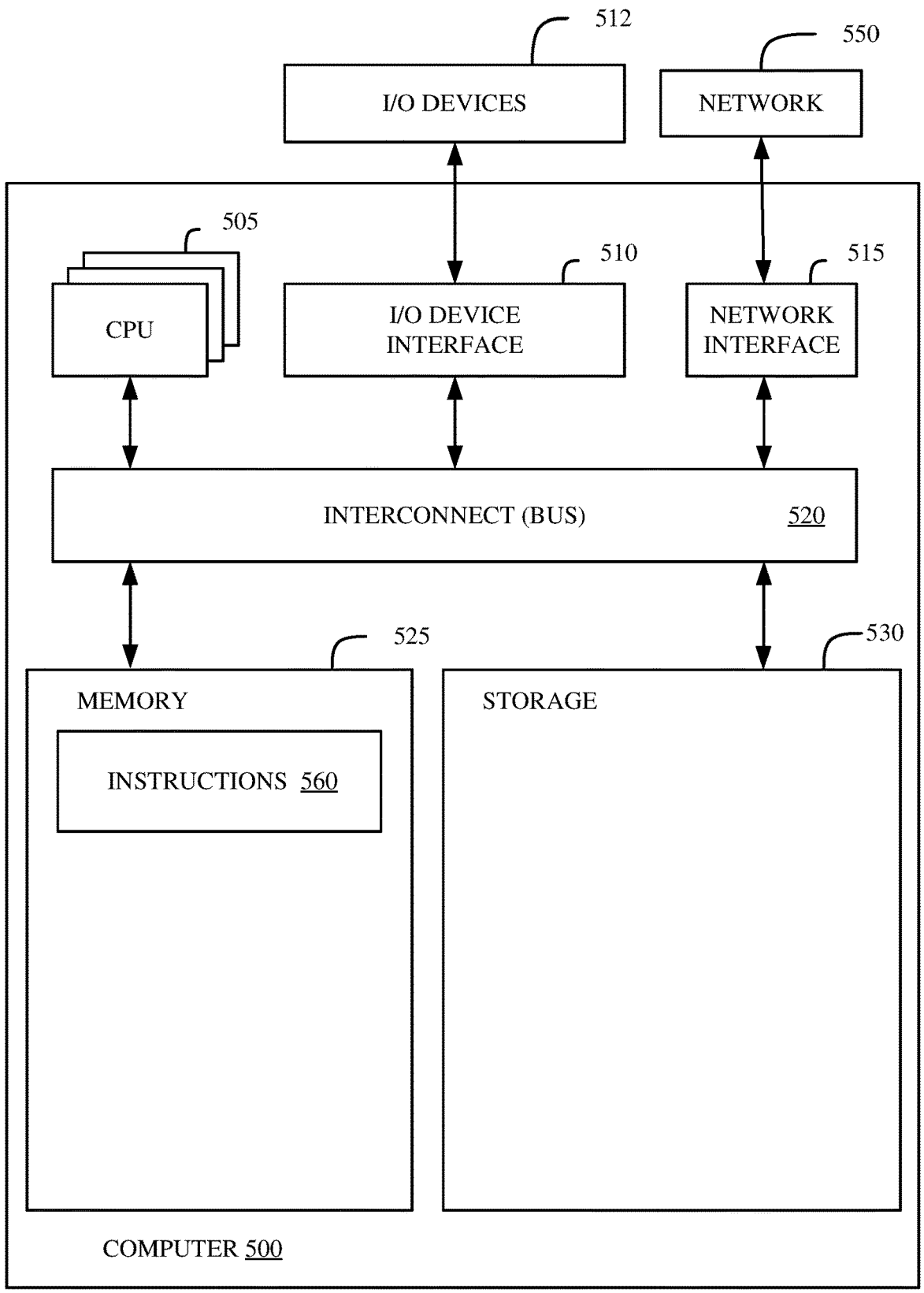
FIG. 5 illustrates a block diagram of an example computer, in accordance with some embodiments of the present disclosure.

FIG. 5 illustrates a block diagram of an example computer 500 in accordance with some embodiments of the present disclosure. In various embodiments, computer 500 can perform the methods described in FIGS. 3, 4A, and/or 4B and/or implement the functionality discussed in FIGS. 1-2. In some embodiments, computer 500 receives instructions related to the aforementioned methods and functionalities by downloading processor-executable instructions from a remote data processing system via network 550. In other embodiments, computer 500 provides instructions for the aforementioned methods and/or functionalities to a client machine such that the client machine executes the method, or a portion of the method, based on the instructions provided by computer 500. In some embodiments, the computer 500 is incorporated into 3D printer 100 or print manager 112.

Computer 500 includes memory 525, storage 530, interconnect 520 (e.g., BUS), one or more CPUs 505 (also referred to as processors herein), I/O device interface 510, I/O devices 512, and network interface 515.

Each CPU 505 retrieves and executes programming instructions stored in memory 525 or storage 530. Interconnect 520 is used to move data, such as programming instructions, between the CPUs 505, I/O device interface 510, storage 530, network interface 515, and memory 525. Interconnect 520 can be implemented using one or more busses. CPUs 505 can be a single CPU, multiple CPUs, or a single CPU having multiple processing cores in various embodiments. In some embodiments, CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random access memory (DRAM), or Flash). Storage 530 is generally included to be representative of a non-volatile memory, such as a hard disk drive, solid state device (SSD), removable memory cards, optical storage, or flash memory devices. In an alternative embodiment, storage 530 can be replaced by storage area-network (SAN) devices, the cloud, or other devices connected to computer 500 via I/O device interface 510 or network 550 via network interface 515.

In some embodiments, memory 525 stores instructions 560. However, in various embodiments, instructions 560 are stored partially in memory 525 and partially in storage 530, or they are stored entirely in memory 525 or entirely in storage 530, or they are accessed over network 550 via network interface 515.

Instructions 560 can be processor-executable instructions for performing any portion of, or all of, any of the methods of FIGS. 3, 4A, and/or 4B and/or implementing any of the functionality discussed in FIGS. 1-2.

Although not explicitly shown, storage 530 can include elements discussed in FIG. 2, such as, but not limited to, component file 200 and/or printing parameters 202 (e.g., print path 204, nozzle parameters 206, material parameters 208, magnetic field parameters 210, and/or moveable platform parameters 212).

In various embodiments, I/O devices 512 include an interface capable of presenting information and receiving input. For example, I/O devices 512 can present information to a user interacting with computer 500 and receive input from the user.

Computer 500 is connected to network 550 via network interface 515. Network 550 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any subset of the methods described with respect to FIGS. 3, 4A, and/or 4B and/or any of the functionality discussed in FIGS. 1-2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A three-dimensional printer comprising:
 a moveable platform configured to support a wireframe component during fabrication, wherein the moveable platform is configured to translate and rotate during fabrication of the wireframe component;
 an oscillating printer head configured to deposit a material onto the moveable platform to fabricate the wireframe component, wherein the printer head oscillates via a dynamically extendable connector through which a filament of the material is fed to the printer head; and
 at least one inductor configured to apply a magnetic field to cause oscillation movement of the oscillating printer head along a print path for fabricating the wireframe component.

2. The three-dimensional printer of claim 1, wherein the oscillating printer head comprises a ferromagnetic material.

3. The three-dimensional printer of claim 1, wherein the oscillating printer head is affixed to an upper portion of the three-dimensional printer using the connector.

4. The three-dimensional printer of claim 3, wherein the connector is a hollow connector, and wherein the hollow connector is configured to receive the filament for fabricating the wireframe component.

5. The three-dimensional printer of claim 4, wherein the hollow connector is heated to a first temperature.

6. The three-dimensional printer of claim 3, wherein the connector is dynamically extendable and dynamically retractable.

7. The three-dimensional printer of claim 1, further comprising:
- a computer-readable storage medium storing printing parameters for the wireframe component, wherein the printing parameters include the print path defining a path of travel and speed of travel for the printer head to print a respective portion of the wireframe component.

8. The three-dimensional printer of claim 7, wherein a simultaneous movement of the moveable platform and the oscillating printer head is configured to equal the path of travel and the speed of travel of the printer head.

9. The three-dimensional printer of claim 1, wherein the wireframe component comprises a plurality of curvilinear filaments.

10. The three-dimensional printer of claim 9, wherein a diameter of each of the filaments is less than or equal to 4.00 millimeters (mm).

11. The three-dimensional printer of claim 1, wherein the wireframe component consists of a single curvilinear filament.

12. The three-dimensional printer of claim 1, wherein the at least one inductor comprises a plurality of inductors surrounding the moveable platform.

13. The three-dimensional printer of claim 12, wherein magnetic field parameters for each of the inductors are independently controllable.

14. The three-dimensional printer of claim 12, wherein each of the inductors is adjustable to different locations proximate to the moveable platform.

15. The three-dimensional printer of claim 1, wherein parameters of the magnetic field are determined based on an impact of gravity and momentum affecting motion of the oscillating printer head.

16. A method of fabricating a wireframe component using the three-dimensional printer of claim 1, the method comprising:
- applying, using the at least one inductor, the magnetic field to the oscillating printer head while depositing the material from the printer head onto the moveable platform during fabrication of a respective portion of the wireframe component; and
- applying a movement to the moveable platform during the fabrication of the respective portion of the wireframe component.

17. A computer program product comprising a computer readable storage medium having program instructions embodied therewith, the program instructions executable by a processor to cause the processor to perform the method of claim 16.

* * * * *